United States Patent [19]

Nonnenmann

[11] 4,310,084

[45] Jan. 12, 1982

[54] FLUID-FILLED FRICTION CLUTCH

[75] Inventor: Manfred Nonnenmann, Schwieberdingen, Fed. Rep. of Germany

[73] Assignee: Süddeutsche Kühlerfabrik Julius Fr. Behr GmbH & Co. KG, Stuttgart, Fed. Rep. of Germany

[21] Appl. No.: 7,791

[22] Filed: Jan. 30, 1979

[30] Foreign Application Priority Data

Feb. 3, 1978 [DE] Fed. Rep. of Germany ....... 2804557

[51] Int. Cl.³ ...................... F16D 35/00; F16D 43/25
[52] U.S. Cl. .............................. 192/58 B; 192/82 T; 251/11
[58] Field of Search ............. 192/82 T, 84 PM, 58 B, 192/84 R, 88 A; 60/528; 251/11

[56] References Cited

U.S. PATENT DOCUMENTS

| 1,879,633 | 9/1932 | Olsen et al. | 192/88 A |
|---|---|---|---|
| 3,179,221 | 4/1965 | Weir | 192/58 B |
| 3,207,279 | 9/1965 | Ahlen | 192/57 |
| 3,250,355 | 5/1966 | Weir | 192/58 B |
| 3,500,634 | 3/1970 | Waseleski et al. | 60/528 |
| 3,684,397 | 8/1972 | Elmer | 192/82 T X |
| 3,757,914 | 9/1973 | Elmer | 192/58 B X |
| 3,860,169 | 11/1975 | Norman | 251/11 X |
| 3,880,265 | 4/1975 | Elmer | 192/58 B |
| 4,086,987 | 5/1978 | Riley et al. | 192/82 T X |
| 4,111,289 | 9/1978 | Brummett | 192/82 T X |

FOREIGN PATENT DOCUMENTS

| 1270339 | 6/1968 | Fed. Rep. of Germany . |
|---|---|---|
| 1284721 | 12/1968 | Fed. Rep. of Germany . |
| 1284186 | 7/1969 | Fed. Rep. of Germany . |
| 2364234 | 7/1975 | Fed. Rep. of Germany .... 192/58 B |
| 2309748 | 11/1976 | France ................................... 60/528 |
| 372515 | 11/1963 | Switzerland ...................... 192/82 T |

Primary Examiner—Rodney H. Bonck
Attorney, Agent, or Firm—Browdy and Neimark

[57] ABSTRACT

A fluid friction clutch especially for powering a rotary cooling fan for an internal combustion engine. The clutch has a driven part with a drive disc rotating in a drive chamber which is separated from a fluid reservoir chamber by a separating wall within the clutch housing. A passage in the separating wall can be opened and closed by a valve assembly which is actuated by a temperature-dependent element. The temperature-dependent element is an expansion element containing a substance which undergoes volume changes as a function of temperature. The expansion element is heated electrically by means of a PTC resistor under the control of a thermal switch which reacts to engine-related temperatures. When the power supply to the PTC heater is interrupted, the clutch engages and provides full cooling power.

2 Claims, 2 Drawing Figures

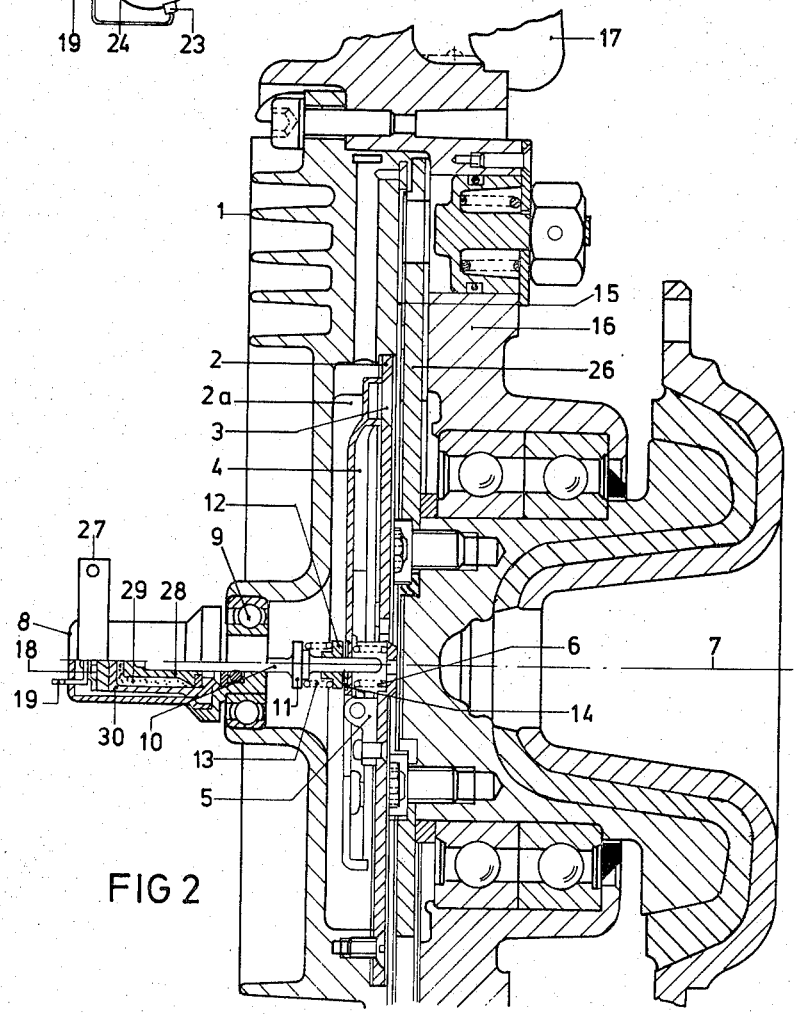

FLUID-FILLED FRICTION CLUTCH

FIELD OF THE INVENTION

The invention relates to fluid-filled friction clutches, especially for use as fan drives for the cooling system of an internal combustion engine.

BACKGROUND OF THE INVENTION

In the construction of cooling systems for motor vehicles, a provision is often made to adapt the operation of the fan or its speed of rotation to the prevailing requirements for engine cooling. This provision is fulfilled by the installation of a controllable variable clutch. Preferred in the art is a fluid clutch in which the degree of fluid filling is variable under the control of mechanisms which sense the engine temperature or air temperature. The fluid clutch includes a housing which is rotatable with respect to the driving shaft and further includes a separating wall which defines a fluid reservoir and a drive chamber in which a drive disc is disposed. The separating wall has an opening whose size can be varied by a valve so as to control the amount of fluid in the clutch. In fluid clutches of this type employed in present-day service, the valve is actuated by bimetallic elements located at the front of the clutch. The change in shape of the thermal sensor is transmitted to the valve by a piston or an actuating pin.

The clutch on which the fan is mounted is located behind the radiator of the engine so that the temperature sensor lies in the stream of the cooling air whose temperature then becomes a measure of the coolant temperature.

A fluid friction coupling of this type is described for example in the German Auslegeschrift No. 12 84 186.

However, the known system described above is not adequate to fill the requirements of various modern cooling systems. For example, in some cases the engine is equipped with a separate radiator for cooling the air used for super-charging and this radiator is located in front of the main radiator for cooling engine water. In other constructions, the radiator is annular and employs a radial fan. Yet again, the fan may be disposed in front of the radiator or the engine may be air-cooled. In all these cases, the fluid friction clutch described above is not applicable.

This is the case because in the aforementioned constructions, the air is either additionally heated by passage through the secondary super-charger radiator or the air is not heated until it has passed the cooling fan. Accordingly, the variable fan clutch must be actuated on the basis of the coolant temperature by disposing a thermal switch or transducer at some critical location and transmitting its signal to the clutch. The medium for transmitting the signal may be compressed air, or electrical current. In the first of these two cases, the necessary piping and seals are a substantial additional expense. A pneumatic control system of this type is known for example from U.S. Pat. No. 3,880,265.

The electrical signal transmission to the clutch is substantially simpler and a control system of this type for use with fluid clutches is known for example from the German Pat. No. 1,270,339. This patent corresponds to U.S. Pat. No. 3,250,355. In this known system, the clutch is actuated by a solenoid which is relatively expensive and heavy enough to apply additional loads to the clutch bearing as well as to the bearing on the driving side, i.e., the water pump bearing or crankshaft bearing.

OBJECT AND SUMMARY OF THE INVENTION

It is thus a principal object of the present invention to provide a fluid-filled clutch which is controlled by an electrical signal from any desired source, for example sensors which detect the air temperature, the coolant water temperature, lubricant temperature, or the like. It is another object of the present invention to provide a fluid-filled clutch which is space-saving, of relatively light weight and inexpensive and which may be used universally in any type of coolant system.

These and other objects are attained according to the invention by providing a fluid-filled clutch of the type described above, i.e., including a rotatable housing and further including an internal wall defining a storage chamber and a drive chamber and wherein the internal wall has an opening which is closable by a valve so as to vary the amount of fluid in the drive chamber and wherein the valve is actuated by a piston that is displaced by an expansion element. The expansion element is of the type which changes volume under the influence of temperature and it is equipped with a local heater that can be actuated arbitrarily and at a distance. In a particular feature of the invention, the heater for heating the expansion element is a PTC resistor which is located at or near the housing of the expansion element and which is supplied with heating power by a thermally responsive switch.

Expansion elements of the type used in this invention are relatively small, light and quite inexpensive because they are required in large numbers for other uses.

Electrically heated temperature sensors in connection with a fluid friction clutch are known from the German Auslegeschrift No. 12 84 721. However, this publication does not give a description of the manner of heating the control element and this heating is critical for the correct functioning of the clutch.

When an expansion element is heated by an electrical heater, the temperature of the element and therefore its change of volume depends on the ambient temperature which may vary, from season to season, between approximately −20° C. and +35° C. This fact makes it difficult to activate the clutch at the right time. This disadvantage is not fully avoided by careful thermal insulation of the control element and not even by heating the latter because the cooling of the control element would be greatly extended due to the insulation, thereby making the overall control process unreliable.

This disadvantage is completely avoided according to the invention by employing a PTC resistor to heat the per se known expansion element. It is the property of PTC resistors to conduct a given electrical current when cool and to be heated rapidly by the passage of this current. When the temperature of the resistor rises, its internal resistance becomes so high that, beginning with a given temperature, practically no conduction takes place. Accordingly, any further heating of the PTC resistor is prevented. When the temperature of the resistor drops, the resistance also decreases and current conduction begins again. Due to this thermostatic property, PTC resistors are very well suited for controlling temperature-dependent processes because any losses due to conduction or radiation are precisely and immediately compensated for.

If the expansion element is heated by a common resistive heating element which is not subject to the high dependence of resistance on temperature of a PTC resistor, the amount of heating of the expansion element is very poorly controlled, resulting in extreme excursions of the actuating piston of the expansion element which increases the reaction time of the clutch to the reduction or termination of the actuating current. This disadvantage is completely overcome by the PTC resistor which prevents an excessive displacement of the actuating piston or reduces it to a minimum.

In one advantageous feature of the invention, the expansion element and the PTC resistor are disposed in the center and at the front of the clutch in a manner permitting relative rotation with respect to the clutch. Accordingly, the expansion element and the resistor are stationary with respect to the engine and electrical current may be provided to the element without the use of slip-rings.

The axial force transmitted from the piston of the expansion element to the internal valve of the clutch is applied to a thrust bearing, for example a roller bearing or a sleeve bearing, permitting the relative rotation of the stationary expansion element and the valve assembly in the clutch.

In a further feature of the invention, the valve element is constructed at least partly from an elastic material, for example spring steel, so as to prevent excessive pressures on the piston or the valve if the expansion element is heated excessively.

The invention will be better understood as well as further objects thereof will become apparent from the description of a preferred embodiment to be read in conjunction with the drawing.

DESCRIPTION OF THE DRAWING

FIG. 1 is a schematic sketch of an internal combustion engine including a cooling system and cooling fan; and FIG. 2 is a partial axial section of a fluid-filled clutch according to the invention.

DESCRIPTION OF THE PREFERRED EMBODIMENT

FIG. 1 shows an internal combustion engine 20 equipped with a cooling system that includes a fan driven by a fluid clutch. The engine 20 is coupled to a radiator 21 via coolant lines 24 and 25 in any suitable manner. Disposed behind the radiator but ahead of the engine is a fan 22 mounted on a fluid-driven clutch according to the invention which is driven in known manner by the crankshaft of the engine 20. In the exemplary embodiment shown, the coolant return line 24 is equipped with an electrical switch, for example a thermal transducer 23 which generates an electrical signal for actuating the fluid-filled clutch. Also shown in FIG. 1 is an electrically heated expansion element 8 which controls the operation of the fluid-filled clutch and which is heated by current received through heater wires 19 which are connected to the thermal switch 23.

The fluid clutch according to the invention is shown in greater detail in FIG. 2. The fluid friction clutch according to the invention includes a frontal housing 1 on which fan blades 17 are fastened in any suitable manner, or are integral therewith. A separating wall 2 divides the clutch into a fluid storage chamber 2a and a drive chamber 15. The rear of the clutch is closed by a rear wall 16. Disposed within the drive chamber 15 is a per se known drive disc 26. The separating wall 2 has an oil admission bore 3 which leads to the drive chamber 15 and the bore 3 may be variably obturated by a valve, for example a lever valve 4. The valve 4 is mounted pivotably in a bearing 5 and is displaced by a piston 10 having a head 11 which acts via a spring 13 on a butt plate 14 in the valve lever 4. The piston 10 is itself displaced by the variable expansion of the expansion element 8. This element is held in a bearing 9 and contains a material 29, for example a wax, which expands against a diaphragm 28 that displaces the piston 10. When the material 29 is heated, it changes from the solid to the liquid state at some temperature, thereby undergoing expansion and exerting a relatively high pressure on the piston 10. Accordingly, the piston 10 is moved to the right as seen in FIG. 2, thereby forcing the valve lever 4 against the oil opening 3, which closes it and disengages the clutch. The temperature of the expansion element is controlled according to the invention by a PTC resistor 18 disposed at or near the housing of the expansion element 8 and supplied with heating current through a line 19 in dependence on the prevailing temperature of some part of the engine or one of its accessories, for example the temperature of the super-charged air, the temperature of the cooling water as shown in FIG. 1, or the temperature of lubricants, cylinder walls, etc. For this purpose, the thermal switch or sensor 23 is placed in direct thermal contact with the part of the engine or the fluid which is to be used as control fluid.

In order to prevent excessive heating of the coolant or parts of the engine when the current supply to the fluid clutch it interrupted, the circuitry of the thermal switch and the PTC resistor is so designed as to cause the clutch to engage when the current fails. Accordingly, the PTC resistor 18 must be continuously supplied with voltage if the clutch is to be disengaged. It has been found that the fan clutch of a motor vehicle operates only during approximately 5% of the entire operational time of the vehicle. Accordingly, electric current must be supplied to the expansion element 8 during approximately 95% of the time that the vehicle is operated. This requirement is admirably met by the characteristics of the PTC resistor 18 which heats the expansion element 8 according to the invention because, when the PTC resistor 18 is continuously heated, only a very low current flows, sufficient only to compensate for cooling effects.

If the actuating current to the PTC resistor is interrupted or reduced, the piston 10 is returned to the left in FIG. 2 by the compression spring 13 and is pushed back into the housing of the expansion element 8, thereby permitting the valve lever 4 to move away from the oil hole 3 under the action of the spring 6 and permitting the flow of oil therethrough.

In the exemplary embodiment shown, the expansion element 8 and its PTC resistor 18 are located in the center, i.e., along the axis 7, of the clutch, at the front thereof and capable of relative rotation therewith. The thrust bearing composed of the thrust bushing 12, the spring 13 and the butt plate 14 serves to transmit the axial force from the piston 10 of the expansion element 8 to the valve lever 4.

In order to prevent the occurrence of excessive stresses on the piston 10 of the valve lever 4, for example if the expansion element 8 is overheated, it is provided according to the invention that at least part of the valve lever 4, i.e., the part nearest the axis 7, is made from an elastic material, for example spring steel. However, it is also possible to make a suitable opening in the valve lever 4 in the vicinity of the axis 7 which permits the end of the piston to move freely therethrough, as illustrated in the example of FIG. 2.

It should be noted that the above-described invention is not limited to the exemplary embodiment illustrated and described and may be used even if the fluid friction clutch is constructed in a manner differing from that illustrated. The substantial requirement for utilization of the apparatus of the invention is that the actuation of the valve which governs the flow of oil through the separating wall between a fluid storage chamber and a drive chamber is controlled by a temperature-dependent control element which is heated with the aid of a PTC resistor.

It should be further noted that the invention includes any variants and developments which are within the capabilities of the person skilled in the art and that it further includes partial or sub-combinations of any characteristics which are illustrated and described hereinabove without thereby departing from the scope of the invention.

I claim:

1. A fluid friction clutch, especially for driving the cooling fan of an internal combustion engine, said friction clutch including rotary drive means, a housing disposed coaxially with said drive means and capable of relative rotation therewith, said housing having a separating wall which defines a drive chamber and a fluid reservoir chamber, said rotary drive means being provided with a drive disc located in said drive chamber, and wherein said separating wall has a passage which provides communication between said drive chamber and said fluid reservoir chamber, and said clutch further includes a valve assembly for opening and closing said passage and a temperature-dependent actuator for actuating said valve assembly, the improvement wherein:
   said temperature dependent actuator element is a power element containing in a casing a substance which undergoes volumetric changes as a function of temperature and a working piston; and the improvement further comprising:
   linkage means for transmitting motions of said working piston to said valve assembly, whereby expansion of said substance causes said valve assembly to close said passage to disengage said clutch;
   resistive heater means housed with said power element for heating said power element in accordance with needed cooling requirements, said heater means being of the type exhibiting a positive temperature coefficient (PTC resistor) and
   thermal switch means for applying power to said resistive heater means as a function of temperature;
   wherein said heater means is at least one PTC resistor, said working element and said PTC resistor are rotatingly disposed on that side of said housing remote from said drive means and in the approximate center thereof; and
   wherein said linkage means includes a valve actuating lever and a thrust bearing assembly for transmitting axial forces from said working piston to said valve assembly via said valve actuating lever.

2. A clutch according to claim 1, wherein said valve actuating lever is elastic at least in the vicinity of the axis of said working piston.

* * * * *